US012602892B2

(12) United States Patent
He

(10) Patent No.: US 12,602,892 B2
(45) Date of Patent: Apr. 14, 2026

(54) WALLPAPER DISPLAY METHOD AND APPARATUS, AND ELECTRONIC DEVICE

(71) Applicant: VIVO MOBILE COMMUNICATION CO., LTD., Guangdong (CN)

(72) Inventor: Junyao He, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 172 days.

(21) Appl. No.: 18/439,116

(22) Filed: Feb. 12, 2024

(65) Prior Publication Data

US 2024/0185549 A1     Jun. 6, 2024

Related U.S. Application Data

(63) Continuation of application No. PCT/CN2022/112699, filed on Aug. 16, 2022.

(30) Foreign Application Priority Data

Aug. 18, 2021    (CN) .......................... 202110952129.2

(51) Int. Cl.
 G06T 19/00         (2011.01)
 G06T 19/20         (2011.01)
(52) U.S. Cl.
 CPC ...... G06T 19/20 (2013.01); G06T 2219/2016 (2013.01)
(58) Field of Classification Search
 None
 See application file for complete search history.

(56) References Cited

U.S. PATENT DOCUMENTS

| | | | | |
|---|---|---|---|---|
| 8,843,838 B2 * | 9/2014 | Hackborn | ................ | G09G 5/14 |
| | | | | 715/764 |
| 2011/0119610 A1 * | 5/2011 | Hackborn | ............. | G06F 3/0488 |
| | | | | 715/764 |
| 2011/0261076 A1 * | 10/2011 | Shinohara | ............. | A63F 13/525 |
| | | | | 345/650 |
| 2014/0089858 A1 * | 3/2014 | Yu | ........................ | G06F 3/04817 |
| | | | | 715/835 |
| 2014/0149943 A1 * | 5/2014 | Zhang | ................ | G06F 3/04815 |
| | | | | 715/848 |
| 2014/0163997 A1 * | 6/2014 | Jiang | ................ | H04M 1/72427 |
| | | | | 704/275 |
| 2014/0267383 A1 * | 9/2014 | Javidan | ............... | G06F 3/04845 |
| | | | | 345/619 |

(Continued)

FOREIGN PATENT DOCUMENTS

| | | |
|---|---|---|
| CN | 106210056 A | 12/2016 |
| CN | 108635807 A | 10/2018 |

(Continued)

*Primary Examiner* — Martin Mushambo
(74) *Attorney, Agent, or Firm* — Price Heneveld LLP

(57) ABSTRACT

This application discloses a wallpaper display method and apparatus, and an electronic device. The method includes: displaying a target wallpaper, where the target wallpaper includes a mountain image; obtaining the number of steps of a user; and adjusting a display effect of the mountain image based on the number of steps, the target number of steps, and a height of a mountain corresponding to the mountain image, where the display effect includes a display angle of the mountain image and a display position of the mountain image.

16 Claims, 2 Drawing Sheets

Display a target wallpaper, where the target wallpaper includes a mountain image    1100

Obtain the number of steps of a user    1200

Adjust a display effect of the mountain image based on the number of steps, the target number of steps, and a height of a mountain corresponding to the mountain image    1300

(56)  References Cited

U.S. PATENT DOCUMENTS

| | | | | |
|---|---|---|---|---|
| 2015/0033160 A1* | 1/2015 | Xie | ...................... | G06F 3/0482 |
| | | | | 715/765 |
| 2015/0138243 A1* | 5/2015 | Lin | .......................... | G06T 7/70 |
| | | | | 345/659 |
| 2015/0205498 A1* | 7/2015 | Levi | .................... | G06F 3/04842 |
| | | | | 715/763 |
| 2019/0096139 A1* | 3/2019 | Chu | ...................... | G06T 15/005 |
| 2019/0152318 A1* | 5/2019 | Wild | ...................... | B60K 35/10 |
| 2019/0155484 A1* | 5/2019 | Chu | ........................ | G09G 5/14 |
| 2020/0159394 A1* | 5/2020 | Chassen | .................. | G06F 16/54 |
| 2021/0096237 A1* | 4/2021 | Patole | .................... | G01S 13/70 |
| 2023/0152956 A1* | 5/2023 | Wang | ...................... | G06T 13/80 |
| | | | | 345/473 |

FOREIGN PATENT DOCUMENTS

| | | | | |
|---|---|---|---|---|
| CN | 112148410 A | * 12/2020 | .......... | G06F 3/0487 |
| CN | 113656136 A | 11/2021 | | |
| JP | 2016047180 A | 4/2016 | | |

* cited by examiner

WALLPAPER DISPLAY METHOD AND APPARATUS, AND ELECTRONIC DEVICE

CROSS-REFERENCE TO RELATED APPLICATIONS

This application is a Bypass continuation application of PCT International Application No. PCT/CN2022/112699 filed on Aug. 16, 2022, which claims priority to Chinese Patent Application No. 202110952129.2, filed on Aug. 18, 2021 and entitled "WALLPAPER DISPLAY METHOD AND APPARATUS, AND ELECTRONIC DEVICE", which are incorporated herein by reference in their entireties.

TECHNICAL FIELD

This application pertains to the technical field of electronic devices, and in particular, to a wallpaper display method and apparatus, and an electronic device.

BACKGROUND

Currently, in the process of using an electronic device, the user may set a wallpaper picture in the system or a picture in the photo album as the wallpaper of the electronic device according to the preference. Wallpapers can be divided into home screen wallpaper and lock screen wallpaper, and the user can set the picture only as the home screen wallpaper or the lock screen wallpaper, or as both the home screen wallpaper and the lock screen wallpaper.

In the related art, the wallpaper set by the user is usually a static picture or a dynamic picture. In the process of using the electronic device, the wallpaper cannot be changed with the state of the electronic device used by the user or the behavior of the user, and a function of the wallpaper is relatively simple.

SUMMARY

Embodiments of this application are intended to provide a wallpaper display method and apparatus, and an electronic device.

According to a first aspect, an embodiment of this application provides a wallpaper display method, and the method includes:

displaying a target wallpaper, where the target wallpaper includes a mountain image;

obtaining the number of steps of a user; and adjusting a display effect of the mountain image based on the number of steps, the target number of steps, and a height of a mountain corresponding to the mountain image, where the display effect includes a display angle of the mountain image and a display position of the mountain image.

According to a second aspect, an embodiment of this application provides a wallpaper display apparatus, and the apparatus includes:

a display module, configured to display a target wallpaper, where the target wallpaper includes a mountain image;

an obtaining module, configured to obtain the number of steps of a user; and an adjusting module, configured to adjust a display effect of the mountain image based on the number of steps, the target number of steps, and a height of a mountain corresponding to the mountain image, where the display effect includes a display angle of the mountain image and a display position of the mountain image.

According to a third aspect, an embodiment of this application provides an electronic device. The electronic device includes a processor, a memory, and a program or an instruction stored in the memory and executable on the processor, where the program or the instruction is executed by the processor to implement steps of the method according to the first aspect.

According to a fourth aspect, an embodiment of this application provides a non-transitory readable storage medium. The non-transitory readable storage medium stores a program or an instruction, and when the program or the instruction is executed by a processor, steps of the method according to the first aspect are implemented.

According to a fifth aspect, an embodiment of this application provides a chip. The chip includes a processor and a communications interface, the communications interface is coupled to the processor, and the processor is configured to run a program or an instruction to implement the method according to the first aspect.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the wallpaper display method provided in the embodiments of this application is described in detail by using specific embodiments and application scenarios thereof.

Figure 1:
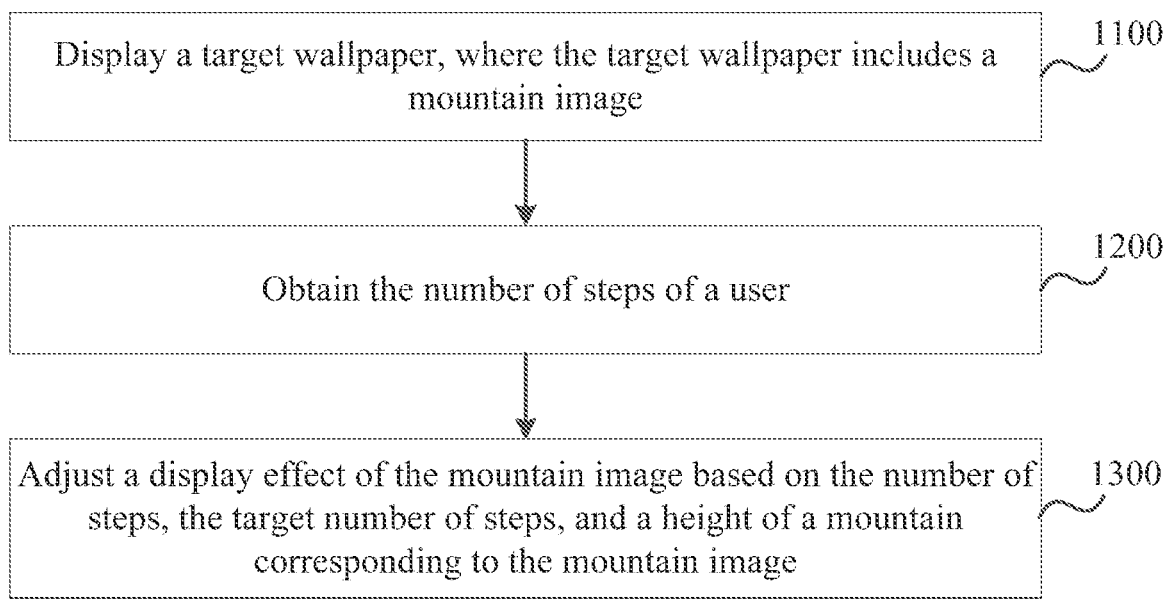
FIG. 1 is a flowchart of a wallpaper display method according to an embodiment of this application.

Referring to FIG. 1, FIG. 1 is a flowchart of a wallpaper display method according to an embodiment of this application. The method can be applied to an electronic device, and the electronic device can be a mobile phone, a tablet computer, a notebook computer, or the like. As shown in FIG. 1, the method may include step 1100 to step 1300, which will be described in detail below.

Step 1100. Display a target wallpaper, where the target wallpaper includes a mountain image.

In some embodiments, the target wallpaper may be a three-dimensional image, that is, the target wallpaper includes a mountain image with a three-dimensional display effect.

It should be noted that, for example, the target wallpaper may be a home screen wallpaper, and the target wallpaper may also be a lock screen wallpaper.

Step 1200. Obtain the number of steps of a user.

The number of steps can be the number of steps that the user has completed and that counted by the electronic device. For example, when the user runs, the number of steps may be the current number of steps counted by a corresponding electronic device. For example, when the user walks, the number of steps may be the current number of steps counted by a corresponding electronic device.

Step 1300. Adjust a display effect of the mountain image based on the number of steps, the target number of steps, and a height of a mountain corresponding to the mountain image.

The target number of steps may be the target number of steps that need to be completed and set by the user. For example, when the user runs or walks, the target number of steps may be the target number of steps set by the user.

In some embodiments, before the adjusting a display effect of the mountain image based on the number of steps, the target number of steps, and a height of a mountain corresponding to the mountain image, the method further includes: receiving a first input from a user; and in response to the first input, obtaining the target number of steps.

The first input may be an input by which the user sets the target number of steps.

For example, the user sets, based on the requirement thereof, a type of target movement and the target number of steps corresponding to the target movement. For example, when the user is about to run, the type of target movement can be set as running, and the corresponding target number of steps can be set. For another example, when the user is about to walk, the type of target movement can be set as walking, and the corresponding target number of steps can be set.

The height of the mountain corresponding to the mountain image can be a total height of the mountain, that is, a distance between the top of the mountain and the ground. For example, the height of the mountain corresponding to the mountain image can be determined based on the name of the mountain. For example, the mountain corresponding to the mountain image is a mountain A, and a height of the mountain A is 8848 meters through searching.

In a case of simulating a movement behavior of the user by using a mountaineering scenario, the display effect of the mountain image can be display effects reflecting mountain images that the user can observe at different mountaineering heights.

The display effect of the mountain image may include a display angle of the mountain image and a display position of the mountain image. The display angle of the mountain image can be display angles of mountain images taken from different perspectives. The display position of the mountain image can be local mountain positions corresponding to different heights.

In this embodiment of this application, the number of steps of a user is obtained;

and a display effect of the mountain image is adjusted based on the number of steps, the target number of steps, and a height of a mountain corresponding to the mountain image, where the display effect includes a display angle of the mountain image and a display position of the mountain image. In this way, the display effect of the mountain image in the target wallpaper can be adjusted based on the number of steps of the user, so that the movement behavior of the user can be simulated as the mountaineering behavior, and the user can intuitively understand the change of the number of steps through the target wallpaper. In addition, this embodiment enriches display modes of the wallpaper and increases enjoyment of using the electronic device.

In some embodiments of this application, the target wallpaper is a three-dimensional image, the display effect includes the display angle of the mountain image, and the adjusting a display effect of the mountain image based on the number of steps, the target number of steps, and a height of a mountain corresponding to the mountain image may further include: adjusting a pitch angle and an orientation of the mountain image based on the number of steps, the target number of steps, and the height of the mountain corresponding to the mountain image.

In this embodiment, with the change of the number of steps of the user, a height where the user is located changes, and an angle of the user for viewing the mountain changes, that is, pitch angles of mountain images corresponding to different numbers of steps are different.

When the movement behavior of the user is simulated as the mountaineering behavior, it usually goes around the mountain to the top of the mountain, that is, with the increase of the number of steps of the user, a side of the mountain observed by the user changes accordingly, that is, orientations of mountain images corresponding to different numbers of steps are also different.

Based on this, based on the number of steps, the target number of steps, and the height of the mountain corresponding to the mountain image, the target height of the mountain corresponding to the number of steps can be determined, the pitch angle and the orientation of the mountain image can be further determined based on the target height of the mountain corresponding to the number of steps, and the display effect of the mountain image in the target wallpaper can be adjusted based on the obtained pitch angle and orientation of the mountain image.

In some optional embodiments, in a case that the target number of steps has a correspondence with the height of the mountain corresponding to the mountain image, the adjusting a pitch angle and an orientation of the mountain image based on the number of steps, the target number of steps, and the height of the mountain corresponding to the mountain image may further include step 2100 to step 2300.

Step 2100. Determine, based on the number of steps and the correspondence, a target height of the mountain corresponding to the number of steps.

The correspondence can be a correspondence between the target number of steps and the height of the mountain corresponding to the mountain image. In other words, different target numbers of steps correspond to different heights of the mountain.

The target height of the mountain can be a height of a mountain where the user is currently located and corresponding to the number of steps.

For example, the target height of the mountain corresponding to the number of steps can be obtained through the following formula (1):

$$h = \frac{H}{S} \times a, \tag{1}$$

where h is the target height of the mountain corresponding to the number of steps, a is the number of steps of the user, S is the target number of steps, and H is the height of the mountain corresponding to the mountain image.

For example, the target number of steps can be divided based on a target number, to obtain a plurality of movement stages, and the movement stages correspond to different target heights of mountains.

The target number can be a number set by the user for dividing the target number of steps. The user can set the target number according to actual needs, so as to divide the target number of steps into a plurality of stages based on target data.

For example, the target number of steps is 21000, and the height of the mountain corresponding to the mountain image is 7000 meters. The target number of steps is divided into 7 stages, a first movement stage includes 0-2999 steps, and a target height of a mountain corresponding to the first movement stage is 1000 meters; a second movement stage includes 3000-5999 steps, and a target height of a mountain corresponding to the second movement stage is 2000 meters; a third movement stage includes 6000-8999 steps, and a target height of a mountain corresponding to the third movement stage is 3000 meters; a fourth movement stage includes 9000-11999 steps, and a target height of a mountain corresponding to the fourth movement stage is 4000 meters; a fifth movement stage includes 12000-14999 steps, and a target height of a mountain corresponding to the fifth movement stage is 5000 meters; a sixth movement stage includes 15000-17999 steps, and a target height of a mountain corresponding to the sixth movement stage is 6000 meters; and a seventh movement stage includes 18000-20999 steps, and a target height of a mountain corresponding to the seventh movement stage is 7000 meters.

It is assumed that the number of steps of the user is 5000, a movement stage of the number of steps is the second movement stage, and the target height corresponding to the second movement stage is taken as the target height of the mountain corresponding to the number of steps.

It should be noted that after the target number of steps is divided based on the target number, different target heights can be set for the movement stages, and a mapping relationship between the movement stage and the target height can be established.

In this embodiment, after the number of steps is obtained, the movement stage of the number of steps is determined, so as to determine, based on the mapping relationship between the movement stage and the target height, the target height of the mountain corresponding to the number of steps, thus combining with subsequent steps, the target position corresponding to the number of steps in the mountain image can be determined based on the target height of the mountain, and the pitch angle and the orientation of the mountain can be adjusted based on the target position. In this way, display effect of the mountain image in the target wallpaper can be adjusted based on the divided movement stage, to reduce a data processing amount, improve a response speed, avoid a wallpaper display delay, and in addition, reduce power consumption of the electronic device.

Step 2200. Determine, based on the target height, a target position corresponding to the number of steps in the mountain image.

The target position corresponding to the number of steps can be positions of the mountain image obtained at different target heights.

Step 2300. Adjust a pitch angle and an orientation of the mountain based on the target position.

When the movement behavior of the user is simulated as the mountaineering behavior, it usually goes around the mountain to the top of the mountain, that is, with the increase of the number of steps of the user, target heights where the user is located are different, target positions where the user is located also different, and pitch angles and orientations of the mountain in different target positions are different. Based on this, the pitch angle and the orientation of the mountain may be adjusted based on the target position corresponding to the number of steps.

In some embodiments of this application, the display effect includes the display position of the mountain image, and the adjusting a display effect of the mountain image based on the number of steps, the target number of steps, and a height of a mountain corresponding to the mountain image may further include step 3100 to step 3200.

Step 3100. Determine a display position of the mountain based on the number of steps, the target number of steps, and the height of the mountain corresponding to the mountain image.

Step 3200. Update the target wallpaper based on the display position of the mountain, where an updated target wallpaper includes a mountain image corresponding to the display position.

In this embodiment, the target wallpaper includes a complete mountain image. The mountain image corresponding to the display position is a part of the complete mountain image. When the target wallpaper is displayed, only the mountain image corresponding to the display position is displayed.

In this embodiment, when the number of steps changes, the mountain image in the target wallpaper can be directly updated, and the updated target wallpaper still includes the mountain image, but the display position of the mountain image included in the updated target wallpaper is different from that in the target wallpaper before updating. For example, when the user starts to move, the mountain image in the target wallpaper currently displayed on the electronic device is a local mountain image corresponding to the foot of the mountain. With the increase of the number of steps of the user, the target wallpaper is updated, and the updated target wallpaper also includes the mountain image, but the display position corresponding to the mountain image in the updated target wallpaper gradually changes.

In this embodiment, in a case that the target number of steps has a correspondence with the height of the mountain corresponding to the mountain image, the target height of the mountain corresponding to the number of steps is determined based on the number of steps and the correspondence, the target position corresponding to the number of steps in the mountain image is determined based on the target height, and the pitch angle and the orientation of the mountain are adjusted based on the target position, so that a realistic mountaineering effect can be created, thus simulating the movement behavior of the user as the mountaineering behavior, and improving the display effect of the wallpaper.

In some embodiments of this application, the display effect includes the display position of the mountain image, the mountain image corresponds to a plurality of wallpapers, different positions of the mountain image correspond to different wallpapers, and the plurality of wallpapers include the target wallpaper. The adjusting a display effect of the mountain image based on the number of steps, the target number of steps, and a height of a mountain corresponding to the mountain image includes step 4100 and step 4200.

Step 4100. Determine a display position of the mountain based on the number of steps, the target number of steps, and the height of the mountain corresponding to the mountain image.

Step 4200. Cancel displaying the target wallpaper and display a first wallpaper among the plurality of wallpapers, where the first wallpaper includes a mountain image corresponding to the display position of the mountain.

In specific implementation, when the number of steps changes, the whole target wallpaper can be directly replaced, that is, the currently displayed target wallpaper is updated with the first wallpaper, and the updated first wallpaper still includes the mountain image, but the mountain image in the first wallpaper is different from that in the target wallpaper. For example, the mountain image in the target wallpaper currently displayed by the electronic device is a mountain image corresponding to the foot of the mountain. With the change of the number of steps, the target wallpaper is updated with the first wallpaper image, and the updated first wallpaper also includes the mountain image. However, with the change of the number of steps.

In some optional embodiments, the target number of steps can be divided based on the target number, to obtain a plurality of movement stages. The movement stages correspond to different display positions of the mountain, that is, each movement stage corresponds to one wallpaper. After the target number of steps is divided based on the target number, different display positions of the mountain can be set for the movement stages, and a mapping relationship between the movement stage and the display position can be established. Then, the number of steps is obtained, and the movement stage of the number of steps is determined, so as to determine, based on the mapping relationship between the movement stage and the display position, the display position of the mountain corresponding to the number of steps, so that the first wallpaper can be determined based on the display position of the mountain in combination with subsequent steps, display of the target wallpaper is canceled, and the first wallpaper is displayed.

In this embodiment, the display position of the mountain image in the target wallpaper can be adjusted based on the divided movement stage, to reduce a data processing amount, improve a response speed, avoid a wallpaper display delay, and in addition, reduce power consumption of the electronic device.

It should be noted that the wallpaper display method provided in the embodiments of this application may be performed by a wallpaper display apparatus, or a control module that is in the wallpaper display apparatus and that is configured to perform the wallpaper display method. In this embodiment of this application, the wallpaper display apparatus provided in the embodiments of this application is described by using an example in which the wallpaper display method is performed by a wallpaper display apparatus.

Figure 2:
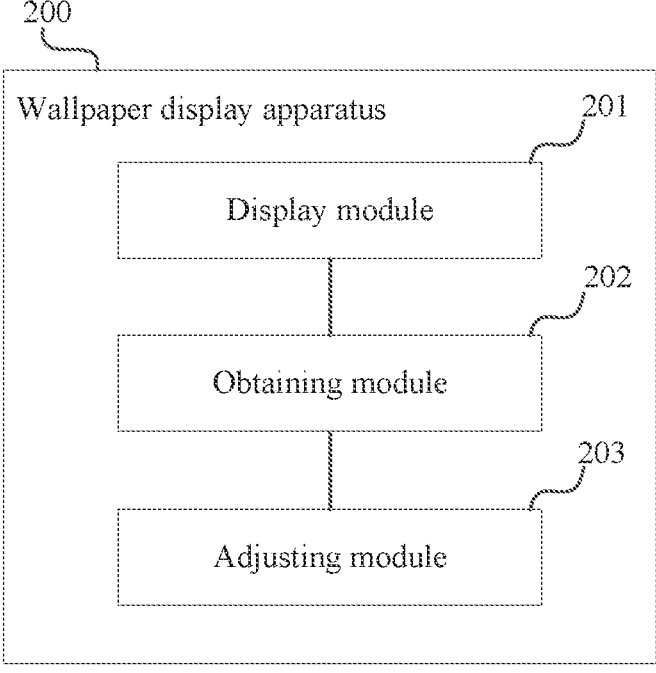
FIG. 2 is a schematic diagram of a structure of a wallpaper display apparatus according to an embodiment of this application.

Corresponding to the foregoing embodiment, referring to FIG. 2, an embodiment of this application further provides a wallpaper display apparatus 200. The wallpaper display apparatus 200 includes a display module 201, an obtaining module 202, and an adjusting module 203.

The display module 201 is configured to display a target wallpaper, where the target wallpaper includes a mountain image;

the obtaining module 202 is configured to obtain the number of steps of a user; and the adjusting module 203 is configured to adjust a display effect of the mountain image based on the number of steps, the target number of steps, and a height of a mountain corresponding to the mountain image, where the display effect includes a display angle of the mountain image and a display position of the mountain image.

In some embodiments, the target wallpaper is a three-dimensional image, the display effect includes the display angle of the mountain image, and the adjusting module 203 includes: an adjusting unit, configured to adjust a pitch angle and an orientation of the mountain image based on the number of steps, the target number of steps, and the height of the mountain corresponding to the mountain image.

In some embodiments, the target number of steps has a correspondence with the height of the mountain corresponding to the mountain image, and the adjusting unit includes: a first determining subunit, configured to determine, based on the number of steps and the correspondence, a target height of the mountain corresponding to the number of steps; a second determining subunit, configured to determine, based on the target height, a target position corresponding to the number of steps in the mountain image; and an adjusting subunit, configured to adjust a pitch angle and an orientation of the mountain based on the target position.

In some embodiments, the display effect includes the display position of the mountain image, and the adjusting module 203 includes: a first determining unit, configured to determine a display position of the mountain based on the number of steps, the target number of steps, and the height of the mountain corresponding to the mountain image; and an updating unit, configured to update the target wallpaper based on the display position of the mountain, where an updated target wallpaper includes a mountain image corresponding to the display position.

In some embodiments, the display effect includes the display position of the mountain image, the mountain image corresponds to a plurality of wallpapers, different positions of the mountain image correspond to different wallpapers, the plurality of wallpapers include the target wallpaper, and the adjusting module includes: a second determining unit, configured to determine a display position of the mountain based on the number of steps, the target number of steps, and the height of the mountain corresponding to the mountain image; and a display unit, configured to cancel displaying the target wallpaper and display a first wallpaper among the plurality of wallpapers, where the first wallpaper includes a mountain image corresponding to the display position of the mountain.

In this embodiment of this application, the number of steps of a user is obtained; and a display effect of the mountain image is adjusted based on the number of steps, the target number of steps, and a height of a mountain corresponding to the mountain image, where the display effect includes a display angle of the mountain image and a display position of the mountain image. In this way, the display effect of the mountain image in the target wallpaper can be adjusted based on the number of steps of the user, so that the movement behavior of the user can be simulated as the mountaineering behavior, and the user can intuitively understand the change of the number of steps through the target wallpaper. In addition, this embodiment enriches display modes of the wallpaper and increases enjoyment of using the electronic device.

The wallpaper display apparatus in this embodiment of this application may be an apparatus, or may be a component, an integrated circuit, or a chip in a terminal. The apparatus may be a mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, or a personal digital assistant (PDA). This is not specifically limited in this embodiment of this application.

The wallpaper display apparatus in this embodiment of this application may be an apparatus with an operating system. The operating system may be an Android operating system, may be an iOS operating system, or may be another possible operating system. This is not specifically limited in this embodiment of this application.

The wallpaper display apparatus provided in this embodiment of this application can implement processes implemented in the method embodiments of FIG. 1. To avoid repetition, details are not described herein again.

Figure 3:
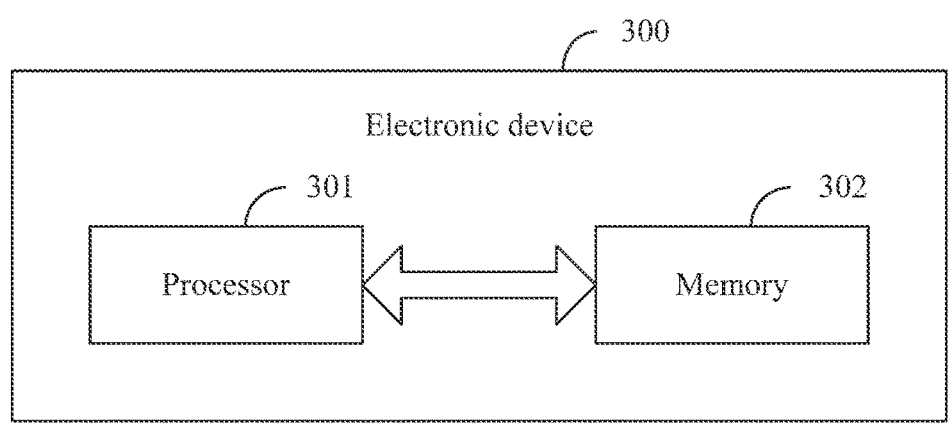
FIG. 3 is a schematic diagram of a structure of an electronic device according to an embodiment of this application.

Corresponding to the foregoing embodiment, optionally, as shown in FIG. 3, an embodiment of this application further provides an electronic device 300, including a processor 301, a memory 302, and a program or an instruction stored in the memory 302 and executable on the processor 301, where the program or the instruction is executed by the processor 301 to implement the processes of the foregoing wallpaper display method embodiment, and a same technical effect can be achieved. To avoid repetition, details are not described herein again.

It should be noted that the electronic device in the embodiments of this application includes the foregoing mobile electronic device.

Figure 4:
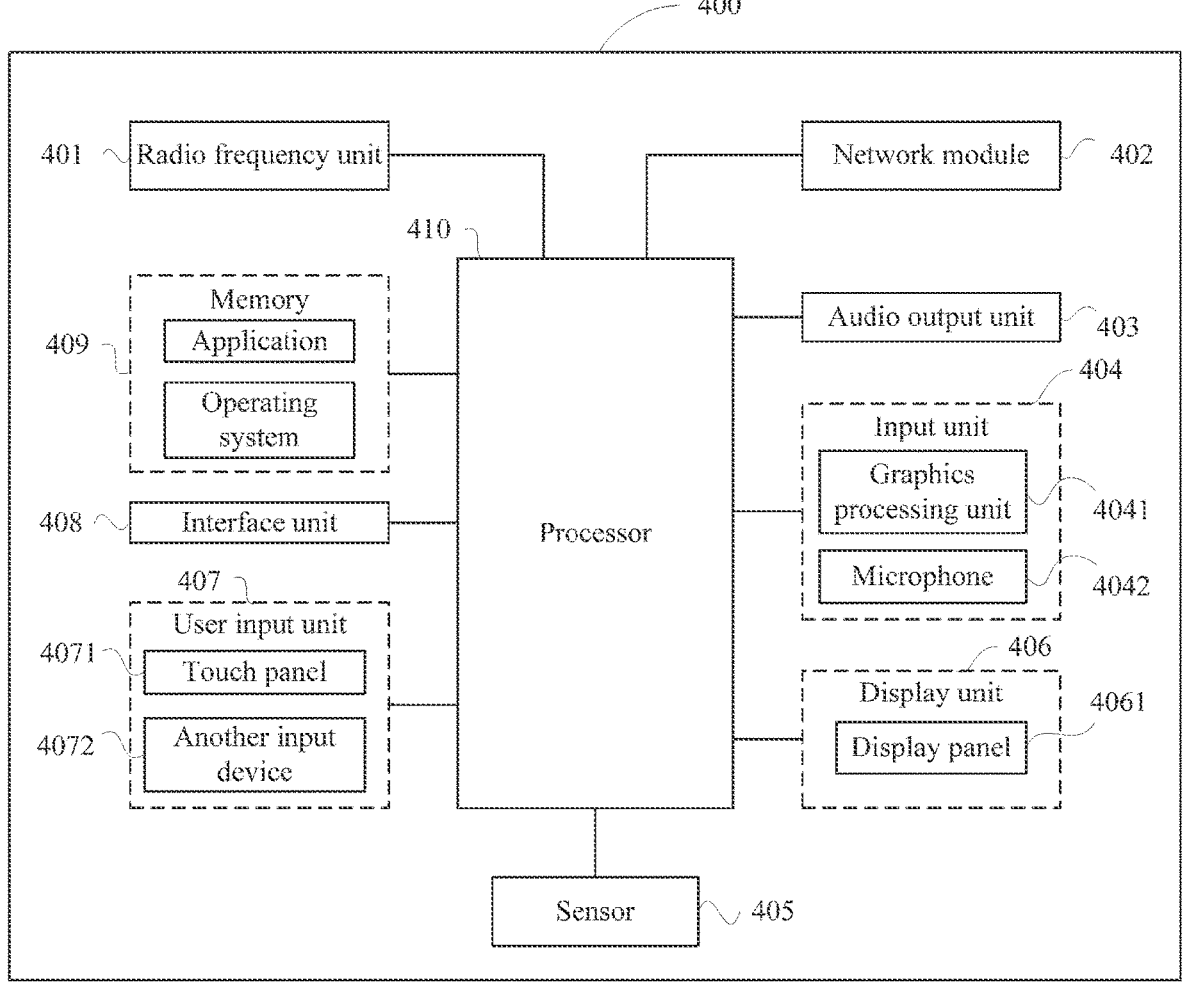
FIG. 4 is a schematic diagram of a structure of another electronic device according to an embodiment of this application.

FIG. 4 is a schematic diagram of a hardware structure of an electronic device according to an embodiment of this application.

An electronic device 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the electronic device 400 may further include a power supply (such as a battery) that supplies power to each component. The power supply may be logically connected to the processor 410 by using a power supply management system, to implement functions such as charging and discharging management, and power consumption management by using the power supply management system. The structure of the electronic device shown in FIG. 4 does not constitute a limitation on the electronic device. The electronic device may include components more or fewer than those shown in the diagram, a combination of some components, or different component arrangements. Details are not described herein.

The processor 410 is configured to display a target wallpaper by using the display unit 406, where the target wallpaper includes a mountain image; obtain the number of steps of a user; and adjust a display effect of the mountain image based on the number of steps, the target number of steps, and a height of a mountain corresponding to the mountain image, where the display effect includes a display angle of the mountain image and a display position of the mountain image.

Optionally, the target wallpaper is a three-dimensional image, the display effect includes the display angle of the mountain image, and when adjusting a display effect of the mountain image based on the number of steps, the target number of steps, and a height of a mountain corresponding to the mountain image, the processor 410 is configured to adjust a pitch angle and an orientation of the mountain image based on the number of steps, the target number of steps, and the height of the mountain corresponding to the mountain image.

Optionally, the target number of steps has a correspondence with the height of the mountain corresponding to the mountain image, and when adjusting a pitch angle and an orientation of the mountain image based on the number of steps, the target number of steps, and the height of the mountain corresponding to the mountain image, the processor 410 is configured to: determine, based on the number of steps and the correspondence, a target height of the mountain corresponding to the number of steps; determine, based on the target height, a target position corresponding to the number of steps in the mountain image; and adjust a pitch angle and an orientation of the mountain based on the target position.

Optionally, the display effect includes the display position of the mountain image, and when adjusting a display effect of the mountain image based on the number of steps, the target number of steps, and a height of a mountain corresponding to the mountain image, the processor 410 is configured to: determine a display position of the mountain based on the number of steps, the target number of steps, and the height of the mountain corresponding to the mountain image; and update the target wallpaper based on the display position of the mountain, where an updated target wallpaper includes a mountain image corresponding to the display position.

Optionally, the display effect includes the display position of the mountain image, the mountain image corresponds to a plurality of wallpapers, different positions of the mountain image correspond to different wallpapers, the plurality of wallpapers include the target wallpaper, and when adjusting a display effect of the mountain image based on the number of steps, the target number of steps, and a height of a mountain corresponding to the mountain image, the processor 410 is configured to: determine a display position of the mountain based on the number of steps, the target number of steps, and the height of the mountain corresponding to the mountain image; and control the display unit 406 to cancel displaying the target wallpaper and display a first wallpaper among the plurality of wallpapers, where the first wallpaper includes a mountain image corresponding to the display position of the mountain.

In this embodiment of this application, the number of steps of a user is obtained; and a display effect of the mountain image is adjusted based on the number of steps, the target number of steps, and a height of a mountain corresponding to the mountain image, where the display effect includes a display angle of the mountain image and a display position of the mountain image. In this way, the display effect of the mountain image in the target wallpaper can be adjusted based on the number of steps of the user, so that the movement behavior of the user can be simulated as the mountaineering behavior, and the user can intuitively understand the change of the number of steps through the target wallpaper. In addition, this embodiment enriches display modes of the wallpaper and increases enjoyment of using the electronic device.

It should be understood that, in the embodiments of this application, the input unit 404 may include a graphics processing unit (GPU) 4041 and a microphone 4042, and the graphics processing unit 4041 processes image data of a still picture or video obtained by an image capture apparatus (such as a camera) in a video capture mode or an image capture mode. The display unit 406 may include a display panel 4061. Optionally, the display panel 4061 may be configured in a form such as a liquid crystal display or an organic light-emitting diode. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein. The memory 409 may be configured to store a software program and various data, including but not limited to an application and an operating system. An application processor and a modem processor may be integrated into the processor 410, the application processor mainly processes an operating system, a user interface, an application, and the like, and the modem processor mainly processes wireless communication. It can be understood that, alternatively, the modem processor may not be integrated into the processor 410.

An embodiment of this application further provides a non-transitory readable storage medium. The non-transitory readable storage medium stores a program or an instruction, and when the program or the instruction is executed by a processor, the processes of the foregoing wallpaper display method embodiment are performed, and a same technical effect can be achieved. To avoid repetition, details are not described herein again.

The processor is a processor in the electronic device in the foregoing embodiment. The non-transitory readable storage medium includes a non-transitory computer-readable storage medium such as a read-only memory (ROM), a random access memory (RAM), a magnetic disk, an optical disc, or the like.

An embodiment of this application further provides a chip. The chip includes a processor and a communications interface, the communications interface is coupled to the processor, and the processor is configured to run a program or an instruction to implement the processes of the foregoing wallpaper display method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A wallpaper display method, wherein the method comprises:

displaying a target wallpaper, wherein the target wallpaper comprises a mountain image;

obtaining the number of steps of a user; and adjusting a display effect of the mountain image based on the number of steps, the target number of steps, and a height of a mountain corresponding to the mountain image, wherein the display effect comprises a display angle of the mountain image and a display position of the mountain image;

wherein the target wallpaper is a three-dimensional image, the display effect comprises the display angle of the mountain image, and the adjusting a display effect of the mountain image based on the number of steps, the target number of steps, and a height of a mountain corresponding to the mountain image comprises:

adjusting a pitch angle and an orientation of the mountain image based on the number of steps, the target number of steps, and the height of the mountain corresponding to the mountain image.

2. The method according to claim 1, wherein the target number of steps has a correspondence with the height of the mountain corresponding to the mountain image, and the adjusting a pitch angle and an orientation of the mountain image based on the number of steps, the target number of steps, and the height of the mountain corresponding to the mountain image comprises:

determining, based on the number of steps and the correspondence, a target height of the mountain corresponding to the number of steps;

determining, based on the target height, a target position corresponding to the number of steps in the mountain image; and adjusting a pitch angle and an orientation of the mountain based on the target position.

3. The method according to claim 1, wherein the display effect comprises the display position of the mountain image, and the adjusting a display effect of the mountain image based on the number of steps, the target number of steps, and a height of a mountain corresponding to the mountain image comprises:

determining a display position of the mountain based on the number of steps, the target number of steps, and the height of the mountain corresponding to the mountain image; and updating the target wallpaper based on the display position of the mountain, wherein an updated target wallpaper comprises a mountain image corresponding to the display position.

4. The method according to claim 1, wherein the display effect comprises the display position of the mountain image, the mountain image corresponds to a plurality of wallpapers, different positions of the mountain image correspond to different wallpapers, the plurality of wallpapers comprise the target wallpaper, and the adjusting a display effect of the mountain image based on the number of steps, the target number of steps, and a height of a mountain corresponding to the mountain image comprises:

determining a display position of the mountain based on the number of steps, the target number of steps, and the height of the mountain corresponding to the mountain image; and canceling displaying the target wallpaper and displaying a first wallpaper among the plurality of wallpapers, wherein the first wallpaper comprises a mountain image corresponding to the display position of the mountain.

5. A chip, wherein the chip comprises a processor of an electronic device and a communications interface, the communications interface is coupled to the processor, and the processor is configured to run a program or an instruction to implement steps of the wallpaper display method according to claim 1.

6. The chip according to claim 5, wherein the target number of steps has a correspondence with the height of the mountain corresponding to the mountain image, wherein when adjusting a pitch angle and an orientation of the mountain image based on the number of steps, the target number of steps, and the height of the mountain corresponding to the mountain image, the program or the instruction, when executed by the processor of the electronic device, causes the electronic device to perform:

determining, based on the number of steps and the correspondence, a target height of the mountain corresponding to the number of steps;

determining, based on the target height, a target position corresponding to the number of steps in the mountain image; and adjusting a pitch angle and an orientation of the mountain based on the target position.

7. The chip according to claim 5, wherein the display effect comprises the display position of the mountain image, wherein when adjusting a display effect of the mountain image based on the number of steps, the target number of steps, and a height of a mountain corresponding to the mountain image, the program or the instruction, when executed by the processor of the electronic device, causes the electronic device to perform:

determining a display position of the mountain based on the number of steps, the target number of steps, and the height of the mountain corresponding to the mountain image; and updating the target wallpaper based on the display position of the mountain, wherein an updated target wallpaper comprises a mountain image corresponding to the display position.

8. The chip according to claim 5, wherein the display effect comprises the display position of the mountain image, the mountain image corresponds to a plurality of wallpapers, different positions of the mountain image correspond to different wallpapers, the plurality of wallpapers comprise the target wallpaper, wherein when adjusting a display effect of the mountain image based on the number of steps, the target number of steps, and a height of a mountain corresponding to the mountain image, the program or the instruction, when executed by the processor of the electronic device, causes the electronic device to perform:

determining a display position of the mountain based on the number of steps, the target number of steps, and the height of the mountain corresponding to the mountain image; and canceling displaying the target wallpaper and displaying a first wallpaper among the plurality of wallpapers, wherein the first wallpaper comprises a mountain image corresponding to the display position of the mountain.

9. An electronic device, comprising a processor, a memory, and a program or an instruction stored in the memory and executable on the processor, wherein the program or the instruction, when executed by the processor, causes the electronic device to perform:

displaying a target wallpaper, wherein the target wallpaper comprises a mountain image;

obtaining the number of steps of a user; and adjusting a display effect of the mountain image based on the number of steps, the target number of steps, and a height of a mountain corresponding to the mountain image, wherein the display effect comprises a display angle of the mountain image and a display position of the mountain image;

wherein the target wallpaper is a three-dimensional image, the display effect comprises the display angle of the mountain image, wherein when adjusting a display effect of the mountain image based on the number of steps, the target number of steps, and a height of a mountain corresponding to the mountain image, the program or the instruction, when executed by the processor, causes the electronic device to perform:

adjusting a pitch angle and an orientation of the mountain image based on the number of steps, the target number of steps, and the height of the mountain corresponding to the mountain image.

10. The electronic device according to claim 9, wherein the target number of steps has a correspondence with the height of the mountain corresponding to the mountain image, wherein when adjusting a pitch angle and an orientation of the mountain image based on the number of steps, the target number of steps, and the height of the mountain corresponding to the mountain image, the program or the instruction, when executed by the processor, causes the electronic device to perform:

determining, based on the number of steps and the correspondence, a target height of the mountain corresponding to the number of steps;

determining, based on the target height, a target position corresponding to the number of steps in the mountain image; and adjusting a pitch angle and an orientation of the mountain based on the target position.

11. The electronic device according to claim 9, wherein the display effect comprises the display position of the mountain image, wherein when adjusting a display effect of the mountain image based on the number of steps, the target number of steps, and a height of a mountain corresponding to the mountain image, the program or the instruction, when executed by the processor, causes the electronic device to perform:

determining a display position of the mountain based on the number of steps, the target number of steps, and the height of the mountain corresponding to the mountain image; and updating the target wallpaper based on the display position of the mountain, wherein an updated target wallpaper comprises a mountain image corresponding to the display position.

12. The electronic device according to claim 9, wherein the display effect comprises the display position of the mountain image, the mountain image corresponds to a plurality of wallpapers, different positions of the mountain image correspond to different wallpapers, the plurality of wallpapers comprise the target wallpaper, wherein when adjusting a display effect of the mountain image based on the number of steps, the target number of steps, and a height of a mountain corresponding to the mountain image, the program or the instruction, when executed by the processor, causes the electronic device to perform:

determining a display position of the mountain based on the number of steps, the target number of steps, and the height of the mountain corresponding to the mountain image; and canceling displaying the target wallpaper and displaying a first wallpaper among the plurality of wallpapers, wherein the first wallpaper comprises a mountain image corresponding to the display position of the mountain.

13. A non-transitory readable storage medium, wherein the non-transitory readable storage medium stores a program or an instruction, wherein the program or the instruction, when executed by a processor of an electronic device, causes the electronic device to perform:

displaying a target wallpaper, wherein the target wallpaper comprises a mountain image;

obtaining the number of steps of a user; and adjusting a display effect of the mountain image based on the number of steps, the target number of steps, and a height of a mountain corresponding to the mountain image, wherein the display effect comprises a display angle of the mountain image and a display position of the mountain image;

wherein the target wallpaper is a three-dimensional image, the display effect comprises the display angle of the mountain image, wherein when adjusting a display effect of the mountain image based on the number of steps, the target number of steps, and a height of a mountain corresponding to the mountain image, the program or the instruction, when executed by the processor of the electronic device, causes the electronic device to perform:

adjusting a pitch angle and an orientation of the mountain image based on the number of steps, the target number of steps, and the height of the mountain corresponding to the mountain image.

14. The non-transitory readable storage medium according to claim 13, wherein the target number of steps has a correspondence with the height of the mountain corresponding to the mountain image, wherein when adjusting a pitch angle and an orientation of the mountain image based on the number of steps, the target number of steps, and the height of the mountain corresponding to the mountain image, the program or the instruction, when executed by the processor of the electronic device, causes the electronic device to perform:

determining, based on the number of steps and the correspondence, a target height of the mountain corresponding to the number of steps;

determining, based on the target height, a target position corresponding to the number of steps in the mountain image; and adjusting a pitch angle and an orientation of the mountain based on the target position.

15. The non-transitory readable storage medium according to claim 13, wherein the display effect comprises the display position of the mountain image, wherein when adjusting a display effect of the mountain image based on the number of steps, the target number of steps, and a height of a mountain corresponding to the mountain image, the program or the instruction, when executed by the processor of the electronic device, causes the electronic device to perform:

determining a display position of the mountain based on the number of steps, the target number of steps, and the height of the mountain corresponding to the mountain image; and updating the target wallpaper based on the display position of the mountain, wherein an updated target wallpaper comprises a mountain image corresponding to the display position.

16. The non-transitory readable storage medium according to claim 13, wherein the display effect comprises the display position of the mountain image, the mountain image corresponds to a plurality of wallpapers, different positions of the mountain image correspond to different wallpapers, the plurality of wallpapers comprise the target wallpaper, wherein when adjusting a display effect of the mountain image based on the number of steps, the target number of steps, and a height of a mountain corresponding to the mountain image, the program or the instruction, when executed by the processor of the electronic device, causes the electronic device to perform:

determining a display position of the mountain based on the number of steps, the target number of steps, and the height of the mountain corresponding to the mountain image; and canceling displaying the target wallpaper and displaying a first wallpaper among the plurality of wallpapers, wherein the first wallpaper comprises a mountain image corresponding to the display position of the mountain.

* * * * *